United States Patent

Johnson

[11] 3,714,075
[45] Jan. 30, 1973

[54] CHLORINATED HYDROCARBON COMPOSITIONS AND USES THEREOF

[75] Inventor: Peter Graham Johnson, Cheshire, England

[73] Assignee: Imperial Chemical Industries Limited, London, England

[22] Filed: Sept. 23, 1970

[21] Appl. No.: 74,912

[30] Foreign Application Priority Data

Oct. 7, 1969  Great Britain.....................49,275/69

[52] U.S. Cl. ..................252/545, 252/153, 252/558
[51] Int. Cl. .............................C11d 1/18, C11d 1/50
[58] Field of Search......252/152, 153, 161, 162, 171, 252/353, 355, 312; 8/142

[56] References Cited

UNITED STATES PATENTS

| | | | |
|---|---|---|---|
| 3,336,232 | 8/1967 | Bauer et al. | 252/153 |
| 3,222,286 | 12/1965 | Barnes | 252/161 |
| 3,355,391 | 11/1967 | Eiseman | 252/153 |
| 3,272,754 | 9/1966 | Jaccard | 252/161 |
| 3,310,499 | 3/1967 | Michaels et al. | 252/152 |
| 3,538,006 | 11/1970 | Benson et al. | 252/137 |
| 3,539,522 | 11/1970 | Lindner | 252/153 |

OTHER PUBLICATIONS

Gafac–Phosphate Ester Surfactants as Dry–Cleaning Detergents, GAF Bulletin, N.Y., 1963, p. 3.

*Primary Examiner*—Leon D. Rosdol
*Assistant Examiner*—P. E. Willis
*Attorney*—Cushman, Darby & Cushman

[57] ABSTRACT

A composition for cleaning and drying articles comprising a chlorohydrocarbon solvent and a metal, ammonium or amine salt of an alkyl benzene sulphonic acid wherein the alkyl group contains from seven to 14 carbon atoms.

10 Claims, No Drawings

CHLORINATED HYDROCARBON COMPOSITIONS AND USES THEREOF

This invention relates to chlorinated hydrocarbon compositions and uses thereof, and particularly to compositions comprising chlorohydrocarbon solvents and surface-active agents and use of such compositions for cleaning and drying articles, for example machinery, instruments and other metal articles, plastic articles which are not effected by the solvent for example polyamides, polypropylene and polytetrafluoroethylene, textile materials and glass articles generally.

It is well known that liquid chlorinated aliphatic hydrocarbons have the property of dissolving grease and oils, and that they can be used to effect degreasing of metals and other articles. It is also well known that the chlorinated aliphatic hydrocarbons, especially trichloroethylene and perchloroethylene, can be used to dry metal and other articles since the boiling solvents have the property of removing water from articles in the form of a constant boiling mixture with the solvent. The constant boiling mixture of trichloroethylene and water contains 13 parts by weight of trichloroethylene and 1 part by weight of water, and that of perchloroethylene and water contains 5 parts by weight of perchloroethylene and 1 part by weight of water.

In drying processes using these solvents, water can be removed simply by distillation since the constant boiling mixture boils at a temperature lower than the boiling point of the pure solvent. The resulting vapors are condensed and the condensate is passed to a water separator wherein the solvent is recovered for re-use. The method can be carried out efficiently in view of the appreciable water content of the constant boiling mixture.

However, processes for drying articles using pure or conventionally stabilized trichloroethylene or perchloroethylene have the disadvantage that the surface of the article tends to become stained due to in situ drying of water droplets. This effect is particularly noticeable in the drying of metal and glass articles. In order to overcome this disadvantage it is necessary that the water droplets be removed from the surface of the article and incorporated in the solvent prior to their evaporation.

Moreover, while the chlorinated hydrocarbon solvents, particularly trichloroethylene and perchloroethylene have the property of dissolving oils and greases they do not remove water-soluble contaminants. It is clearly desirable, therefore, to increase the potential uses of these solvents by using them in admixture with water, but simple physical mixtures of these solvents and water are not effective as cleaning agents.

We have found that the properties of the chlorinated hydrocarbon solvents can be modified to confer upon them the property of taking up water in the form of an emulsion of water in the solvent (a water-in-oil emulsion) by incorporating therein a metal, ammonium or amine salt of an alkyl benzene sulphonic acid wherein the alkyl group contains from seven to 14 carbon atoms. These salts are commonly known as alkyl benzene sulphonates and we have found that they are efficient in enabling appreciable amounts of water to be emulsified in chlorinated hydrocarbon solvents.

According to the present invention we provide a composition comprising a chlorohydrocarbon solvent and a metal, ammonium or amine salt of an alkyl benzene sulphonic acid wherein the alkyl group contains from seven to 14 carbon atoms.

Particularly good results have been obtained using salts of alkyl benzene sulphonic acids wherein the alkyl group contains 11, 12 or 13 carbon atoms (straight-chain or branched-chain) i.e. undecyl-, dodecyl- and tridecylbenzene sulphonic acids. We prefer to employ a salt which is soluble in the chlorohydrocarbon solvent. Where the salt is a metal salt, the metal is preferably an alkaline earth metal, notably calcium. A particularly suitable metal salt for incorporation into trichloroethylene is the calcium salt of tridecyl benzene sulphonic acid.

A wide variety of amines may be used to form the salt of the alkyl benzene sulphonic acid. Amines which can be used include the primary, secondary and tertiary alkylamines or alkanolamines, aromatic amines, cyclic amines and heterocyclic compounds containing N as heteroatom. Particularly suitable amines, however, are methylamine and ethylamine and especially suitable salts are the methylamine salts of dodecyl benzene sulphonic acid and tridecyl benzene sulphonic acid, and the triethylamine salts of undecyl benzene sulphonic acid and dodecyl benzene sulphonic acid. Particularly suitable ammonium salts which may be used are the ammonium salts of undecyl benzene sulphonic acid and dodecyl benzene sulphonic acid.

Solutions of the salt in the solvent have the property of emulsifying water and forming a water-in-oil emulsion.

According to a further feature of the invention we provide a composition comprising a chlorohydrocarbon solvent, a metal, ammonium or amine salt of an alkyl benzene sulphonic acid wherein the alkyl group contains from seven to 14 carbon atoms, and water. Depending on the amounts of water and the salt in the composition, the emulsion may be clear and stable or it may be milky with a tendency to instability. In particular we have found that there is a critical ratio of water to the salt below which the emulsion is clear and stable and above which the emulsion is milky. There is a particular critical ratio of every combination of salt and solvent employed and this can be readily determined by simple experiment. As a general guide, however, the critical ratio of water:salt in emulsions in trichloroethylene is about 1.5:1 although the ratio may vary in the range say 0.8:1 to 1.8:1 depending on the particular salt employed. As a further guide the critical ratio of water:salt in emulsions in 1,1,1-trichloroethane is of the order of 3:1.

By way of example, an emulsion in trichloroethylene of 1 part by weight of ammonium dodecyl benzene sulphonate and 1 part by weight of water is clear and transparent and is stable for prolonged periods. On the other hand, an emulsion in trichloroethylene of 1 part of calcium tridecyl benzene sulphonate and 60 parts by weight of water is a milk in which phase separation commences within a few hours if the emulsion is allowed to stand without agitation.

The compositions which contain water, particularly those containing appreciable quantities of water and which are either clear or milky are useful as cleaning agents for articles immersed therein; the articles are freed from grease and oils, and also water-soluble contaminants.

We have found that for practical cleaning purposes the amount of water which is emulsified in the solvent should preferably be at least 1 percent by weight but need not be greater than about 60 percent by weight of the resulting emulsion. In order to be capable of emulsifying this amount of water and forming a water-in-oil emulsion there is no advantage in using a total amount of surface active agent greater than 33 percent by weight based on the weight of the emulsion and we have found that for most practical purposes the total amount of surface active agent need not exceed 20 percent by weight based on the emulsion.

The composition should preferably contain at least 0.1 percent by weight of the salt and in the case of clear emulsions the amount of the salt should preferably be at least 1 percent by weight.

Other substances may be incorporated in the compositions instead of but preferably in addition to water, in which case it is preferred to have a clear emulsion. Examples of such other substances are ammonia, hydrogen peroxide, phosphoric acid, hydrochloric acid and metal chelating agents. Dyestuffs may also be incorporated in the compositions. The amount of such substances which can be tolerated in emulsions of water in the chlorinated hydrocarbon solvent is limited by their causing phase separation of the emulsion when present in appreciable quantities. The maximum amount of the substance which can be tolerated in clear emulsions depends upon the particular substance and can be determined by simple experiment.

The compositions of the invention may be used as drying agents in which case they are preferably substantially free from water, although this is not essential providing the composition is clear. The water-free composition should preferably be capable of emulsifying large amounts of water to form a clear emulsion and the amount of the salt can be as described above in respect of cleaning agents.

The chlorohydrocarbon solvent constituent of the compositions can be any liquid chlorohydrocarbon solvent, especially a chloroaliphatic hydrocarbon for example trichloroethylene, perchloroethylene, 1,1,1-trichloroethane, beta-trichloroethane, cis and trans dichloroethylenes and methylene dichloride.

We have found that only a limited amount of electrolytes can be incorporated in the clear emulsions of the invention since appreciable amounts of electrolytes cause a portion of the water to separate out into a distinct layer when the composition is allowed to stand, for instance overnight, without any form of agitation. If this phase separation occurs the separated water layer can be discharged and if appropriate fresh water can be added before the composition is re-used. Separation of the emulsions due to the presence of electrolytes is often an advantage since, after the separation, the electrolyte is present in the water layer and can be removed with that layer. Thus, for example, electrolytes entering the emulsions during cleaning of articles may cause separation of the emulsion during periods when the emulsion is not being used. Removal of the separated water layer, for example by skimming, thus removes the electrolytes from the treatment vessel and so risk of redeposition of electrolytes on the article to be cleaned subsequently is reduced, thus enabling stain-free cleaning of articles to be achieved even if those articles are contaminated with metal salts and electrolytes. We prefer to use distilled or de-ionized water in the cleaning compositions of the invention.

Similarly in the drying of wet articles any electrolyte entering the composition together with appreciable amounts of water will cause the water to separate out when the composition is allowed to stand without agitation. If desired water may be added at the end of the drying operation to achieve this effect.

If required the compositions of the invention may contain one or more stabilizers. Stabilization may be required against decomposition of the solvent induced by the presence of metals, (especially aluminum and zinc) and/or by heat and light. For example it may be necessary to stabilize the solvent to inhibit attack on metal articles being cleaned or dried or on the materials of construction of the cleaning or drying and rinsing tanks. Any of the known stabilizing additives for halogenated hydrocarbon solvents may be employed to prevent these decomposition reactions. Examples of such stabilizing additives are nitroalkanes and other alkyl and aryl nitro-compounds, epoxides, amines for example triethylamine, alkanolamines, cyclic ethers, ketones, substituted phenols, pyrroles and alcohols for example propargyl alcohol. Usually the total amount of stabilizers added will not exceed 10 percent by weight of the composition. In addition to stabilizers, compounds known to inhibit tarnishing of copper and brass may be added.

Cleaning or drying of articles using the appropriate composition is carried out in the case of clear compositions simply by immersing the articles in the composition for a suitable period of time, for example 60 seconds. The article is then removed and will generally be rinsed in a pure solvent (conveniently the same solvent as is used in the composition) to remove traces of the alkylbenzene sulphonic acid salt or other additives which may have become deposited on the article. When cleaning with compositions which are milky, it is preferred to spray the composition on to the workpiece and/or to agitate the composition. Cleaning compositions which are clear can be used at their boiling points, thus producing sufficient agitation of the composition, both in the cleaning and in the rinsing treatments, but if desired lower temperatures, conveniently room temperature, can be used in conjunction with ultrasonic agitation. Compositions which are milky are preferably not used at their boiling points although they can be used at slightly elevated temperatures for example up to about 40°C. Also, after cleaning with a milky emulsion, the first rinse is preferably carried out in cold solvent. Preferably, where the rinsing is carried out in cold solvent, a further rinse in boiling solvent or in solvent vapor is carried out since this enables the solvent to evaporate quickly from the article after rinsing. Drying compositions (which are preferably clear) will usually be used at the boil, but they can be used at lower temperatures in conjunction with ultrasonic agitation. After drying, the articles will be rinsed as described above.

The articles, after treatment to clean or dry them have surface active agent deposited on them and this deposit is removed in the rinse treatment.

The water-free compositions and the clear emulsions of the invention are stable on storage and are usually colorless transparent liquids even at the boil and after refluxing for prolonged periods. The compositions (clear or milky) are prepared very easily by adding the salt of the alkylbenzene sulphonic acid to the solvent and stirring the mixture to dissolve the salt. In the case of cleaning compositions water is then added with stirring. The water content of the compositions is very easily adjust by adding water to increase the content or by stripping water from the composition, for example by distillation or by adding an electrolyte followed by skimming off the resulting water layer, to decrease the water content. Normally, using a boiling clear composition to dry articles there will be little or no water in the composition after use unless a large batch of wet articles is dried immediately prior to switching off the heat supply to the drying bath.

The compositions of the invention which contain water (whether clear or milky) can be used to clean metal (though special additives may be necessary to prevent corrosion of the metal), insoluble plastics, glass, textile materials and other articles and the water-free compositions can be used to dry such articles. Cleaning results in the removal of grease and oil and water-soluble dirt. Drying results in the removal of water from the articles. The drying compositions are particularly useful, for example, for drying metal articles following electroplating processes.

The invention is illustrated but in no way limited by the following examples, wherein all parts and percentages are by weight unless otherwise stated:

EXAMPLE 1

4.0 parts of ammonium dodecyl benzene sulphonate were added to 90.0 parts of a commercially available grade of trichloroethylene containing stabilizers and the mixture was agitated. Distilled water was then added and the mixture again agitated to form a clear water-in-oil emulsion, the amount of water being such as to give an emulsion containing 6 percent of water based on the total emulsion. The emulsion was then used to clean articles by the following procedure.

The emulsion is placed in a tank provided with means (e.g. a transducer) for ultrasonic agitation of the composition. Trichloroethylene (commercially available grade containing stabilizers) is poured into both compartments of a two-compartment tank which is separated from the tank containing the emulsion. In the two-compartment tank the compartments are in communication through a horizontal slit in their common wall. One of the compartments (the rinsing compartment) is provided with means (e.g. a transducer) for ultrasonic agitation of the solvent in the compartment, and the other (the vapor compartment) is provided with a heater to enable the solvent therein to be boiled. The vapor compartment is provided close to its upper end with cooling coils to condense the vapor emitted by the boiling solvent and to form a vapor zone above the surface of the boiling solvent. Pure solvent is poured into the vapor compartment to a level below the slit in the common wall, and in the rinsing compartment to a level such that a slight flow results through the slit into the vapor compartment. Means are provided for collecting the liquid solvent condensing from the cooling coils of the vapor compartment and passing this liquid solvent to the rinsing compartment.

The article to be cleaned is immersed for about 30 seconds in the water-in-oil emulsion which is ultrasonically agitated. The cleaned article is then immersed for about 30 seconds in the pure solvent which is ultrasonically agitated in the rinsing compartment. The article is then held for about 30 seconds in the vapor zone of the vapor compartment in which the solvent is boiling. The article is removed from the vapor and it dries rapidly.

By this procedure a wide variety of articles have been cleaned, including for example metal pressings and extrusions, wire drawing dies, spinerettes, polished metals, silicon slices, lenses and microscope slides. In each case the cleaned articles were completely free from grease, oils and water-soluble dirt, and they were also free from drying stains.

EXAMPLE 2

A drying composition was prepared by adding 2.0 parts of ammonium dodecyl benzene sulphonate to 98.0 parts of stabilized trichloroethylene and agitating the resulting mixture. The composition was then used to dry articles by the following procedure:

The composition is placed in one of the compartments of a two-compartment tank in which the compartments are in communication by a horizontal slit in the common wall. The upper level of the composition is below this slit and stabilized trichloroethylene is poured into the other compartment (the rinsing compartment) to a level such that a slight overflow results through the slit into the composition. The two compartments are provided with heating coils to enable the composition and the pure solvent to be boiled. Cooling coils are provided to condense vapors emitted from the compartments as a result of this boiling, means being provided for passing the total condensates (consisting of pure solvent initially but also water once a wet article has been introduced into the drying composition) to a water separator from which the pure solvent can be returned to the rinsing compartment.

Both the drying composition and the pure solvent in the rinsing compartment are boiled continuously and the wet article to be dried is immersed in the drying composition. The composition froths initially but the froth rapidly disperses. After a suitable period of time, usually about 30 seconds, the article is removed from the composition and is immediately immersed in the pure solvent in the rinsing compartment, again for a period of about 30 seconds. The dried article is then removed from the rinse liquor. During this drying procedure, condensed solvent is continuously introduced into the rinsing compartment from the water separator, and this causes the rinsing liquor, consisting essentially of pure solvent, to overflow through the slit into the drying composition. In this way any surface active agent which enters the rinsing compartment as a result of rinsing of the articles is gradually returned to the drying composition.

A variety of articles were each treated separately as follows. The article was held under a tap until it was thoroughly wet with water. The water on the article was usually in the form of droplets and/or a film, and articles of complicated shape contained water in holes and various undercut portions. The article was immersed in the boiling drying composition for a period of about 30 seconds and was then immersed in the rinsing compartment containing boiling rinsing liquor again for a period of 30 seconds. The drying ability of the composition was tested on a wide variety of articles, particularly on polished metals, lenses and microscope slides. In each case no traces of water were detectable on the treated articles. Moreover, the treated (dried) articles were free from staining.

During periods when the apparatus was not in use, the composition and the rinsing liquor were allowed to cool, and 2 percent by weight of water, based on the total composition was added to the drying composition which was then stirred until a homogeneous emulsion was formed. It was found that after drying articles which contained water to which an electrolyte had been added, a water layer had formed overnight on the surface of the composition. This layer was skimmed off prior to re-use of the composition and it was found that the composition continued to dry articles without causing staining.

EXAMPLE 3

The procedure of Example 2 was repeated except that perchloroethylene (98 parts) was employed instead of trichloroethylene.

The treated articles (polished metals, lenses and microscope slides) were free from staining and no traces of water could be detected on them.

The procedure described in Example 2 for eliminating electrolytes from the composition was successfully employed in the case of the perchloroethylene composition.

EXAMPLE 4

The cleaning composition described in Example 1 was placed in one compartment of a tank and trichloroethylene (stablized grade) was placed in two adjacent compartments of the tank, each colorless, being provided with a heater so that the contents could be boiled.

The composition and the pure solvent in the adjacent compartments of the tank were heated to the boil, and glass lenses contaminated with grease, finger marks and general dust were immersed in the boiling composition for a period of 60 seconds after which they were withdrawn and immersed in the first tank of boiling solvent to rinse any surface active agent from the assemblies. Rinsing was for about 60 seconds, followed by a second rinse for about 60 seconds in the second tank of boiling solvent. On withdrawal from the second tank the lenses dried rapidly and were found to be free from contamination.

EXAMPLE 5

The procedure of Example 4 was repeated using instead of the trichloroethylene composition a composition of the formula

|  | Parts |
|---|---|
| 1,1,1-trichloroethane (stabilized grade) | 96 |
| methylamine undecyl benzene sulphonate | 2 |
| water | 2 |

The heated articles on withdrawal from the second tank were dry and completely free from contamination.

EXAMPLE 6

This example illustrates the formulation of a water-in-oil emulsion useful for cleaning a variety of articles. The emulsion was found to be stable, even at the boil, and was clear and colorless. The solvent was a commercially available stabilized grade of trichloroethylene.

|  | Parts by Weight |
|---|---|
| trichloroethylene | 98.2 |
| calcium tridecyl benzene sulphonate | 1.0 |
| water | 0.8 |

EXAMPLES 7–12

These examples illustrate formulations of water-in-oil emulsions which are clear and stable and which are useful for cleaning a wide variety of articles. The compositions are stable and colorless, even at the boil. In each example a commercially available (stabilized) grade of solvent was employed:

| Ex. No. | Solvent (parts w/w) | | Salt (parts w/w) | | Distilled Water (parts w/w) |
|---|---|---|---|---|---|
| 7 | trichloroethylene | (97.2) | triethylamine undecyl benzene sulphonate | (1.0) | water (1.8) |
| 8 | " | (97.2) | triethylamine dodecyl benzene sulphonate | (1.0) | water (1.8) |
| 9 | 1,1,1-trichloroethane | (97.0) | dimethylamine undecyl benzene sulphonate | (1.0) | water (2.0) |
| 10 | " | (97.0) | trimethylamine tridecyl benzene sulphonate | (1.0) | water (2.0) |
| 11 | " | (97.5) | trimethylamine undecyl benzene sulphonate | (1.0) | water (1.5) |
| 12 | trichloroethylene | (97.7) | ammonium undecyl benzene sulphonate | (1.0) | water (1.3) |

Each of these compositions was used successfully to clean a variety of polished metals, lenses and microscope slides.

EXAMPLE 13

1.0 parts by weight of ammonium dodecyl benzene sulphonate was added to 59.5 parts of a commercially available grade of trichloroethylene containing stabilizers and the mixture was agitated. 39.5 parts of distilled water were added and the mixture agitated by means of a high speed stirrer for several minutes. The resulting milky emulsion was then used to clean articles by the following procedure:

The emulsion was placed in a tank and the articles were submerged in the emulsion and agitated for up to 2 minutes. They were then rinsed by agitating in cold trichloroethylene (commercially available grade containing stabilizers for about 1 minute, and then further rinsed in boiling trichloroethylene for 1 minute, after which they were withdrawn and dried rapidly. By this procedure a variety of polished metals, glass articles, and plastic articles were successfully cleaned.

EXAMPLE 14

1.0 part by weight of triethylamine undecyl benzene sulphonate was added to 49.5 parts of a commercially available grade of trichloroethylene containing stabilizers and the mixture was agitated. 49.5 parts of distilled water were added and the mixture was again agitated by means of a high speed stirrer for several minutes. The resulting milky emulsion was then used to clean articles by the following procedure:

The emulsion was placed in a tank fitted with means for spraying the emulsion on the workpiece at a pressure of about 5 psig. The article was sprayed with the emulsion for up to 2 minutes after which it was rinsed as described in example 13, after which it was withdrawn and dried rapidly. By this procedure a variety of metals, glass and plastic articles were cleaned.

EXAMPLES 15 and 16

The procedure of example 13 was employed to clean successfully a variety of articles using a composition having the formulation:

|  | Parts by Weight |
|---|---|
| 1,1,1-trichloroethane | 59.5 |
| *salt | 1.0 |
| distilled water | 39.5 |

*Example 15 -dimethylamine undecyl benzene sulphonate.
Example 16 -trimethylamine tridecyl benzene sulphonate.

In these examples, rinsing in both cases was in a commercially available grade of 1,1,1-trichloroethane.

EXAMPLE 17

The procedure of example 14 was employed to clean successfully a variety of articles using a composition of the formulation:

|  | Parts by Weight |
|---|---|
| trichloroethylene stabilized | 59.5 |
| ammonium dodecyl benzene sulphonate | 1.0 |
| distilled water | 39.5 |

What we claim is:

1. A composition for cleaning and drying articles consisting essentially of a chlorinated aliphatic hydrocarbon solvent selected from the group consisting of trichloroethylene, perchloroethylene, 1,1,1-trichloroethane, beta-trichloroethane, cis and trans-dichloroethylenes and methylene dichloride, up to 60 percent by weight of water, and from 0.1 to 33 percent by weight of an emulsifying agent which is soluble in the solvent and is selected from the group consisting of calcium, ammonium and primary, secondary and tertiary methylamine and ethylamine salts of alkyl benzene sulphonic acids wherein the alkyl group contains from 11 to 13 carbon atoms.

2. A composition as claimed in claim 1 wherein the amount of the salt is at least 1 percent by weight based on the composition.

3. A composition as claimed in claim 1 wherein the solvent is trichloroethylene.

4. A composition as claimed in claim 1 wherein the solvent is perchloroethylene.

5. A composition as claimed in claim 1 wherein the salt of an alkyl benzene sulphonic acid is the calcium salt.

6. A composition as claimed in claim 1 which contains water and wherein the ratio of the amounts of the salt and water are such that the composition is clear and stable.

7. A composition as claimed in claim 1 which contains at least 1 percent by weight of water.

8. A method of cleaning articles which comprises immersing the articles in a composition as claimed in claim 1, withdrawing the articles and subsequently rinsing them in a chlorinated aliphatic hydrocarbon solvent which is the same as that employed in the composition.

9. A method of drying articles which comprises immersing the articles in a composition as claimed in claim 1 which is capable of emulsifying water to form a clear water-in-oil emulsion, withdrawing the articles and subsequently rinsing them in a chlorinated aliphatic hydrocarbon solvent which is the same as that employed in the composition.

10. A method as claimed in claim 9 wherein the composition initially is substantially free from water.

* * * * *